United States Patent [19]
Mosley, Jr. et al.

[11] Patent Number: 4,530,103
[45] Date of Patent: Jul. 16, 1985

[54] METHOD AND APPARATUS FOR BASEBAND TRACKING OF A PN CODE SEQUENCE IN A SPREAD SPECTRUM RECEIVER

[75] Inventors: William H. Mosley, Jr.; David E. Sanders, both of St. Petersburg; George P. Bortnyk, Seminole, all of Fla.

[73] Assignee: E-Systems, Inc., Dallas, Tex.

[21] Appl. No.: 525,297

[22] Filed: Aug. 22, 1983

[51] Int. Cl.³ .............................................. H04K 1/04
[52] U.S. Cl. ................................... 375/1; 375/9; 375/115
[58] Field of Search .............. 375/1, 115, 96; 370/107; 343/5 PN; 329/122; 364/728

[56] References Cited
U.S. PATENT DOCUMENTS

| | | | |
|---|---|---|---|
| 3,947,634 | 3/1976 | Betts | 375/1 |
| 4,017,798 | 4/1977 | Gordy et al. | 375/1 |
| 4,030,033 | 6/1977 | Bibl et al. | 375/96 |
| 4,041,391 | 8/1977 | Deerkoski | 375/1 |
| 4,112,372 | 9/1978 | Holmes et al. | 375/111 |
| 4,112,393 | 10/1978 | Gordy et al. | 331/109 |
| 4,164,628 | 8/1979 | Ward et al. | 375/1 |
| 4,203,070 | 5/1980 | Bowles et al. | 375/1 |
| 4,221,005 | 9/1980 | La Flame | 375/115 |
| 4,285,060 | 8/1981 | Cobb et al. | 375/1 |
| 4,291,409 | 9/1981 | Weinberg et al. | 375/1 |
| 4,301,537 | 11/1981 | Roos | 375/1 |
| 4,426,712 | 1/1984 | Gorski-Popiel | 370/107 |

Primary Examiner—Robert L. Griffin
Assistant Examiner—Stephen Chin
Attorney, Agent, or Firm—Albert M. Crowder, Jr.

[57] ABSTRACT

A method and apparatus for baseband synchronizing of a local PN code sequence with a received PN code sequence incorporated in a received spread spectrum signal is provided. The received spread spectrum signal is translated to baseband to produce an I (in-phase) channel baseband signal and a Q (quadrature-phase) channel baseband signal. Data and error baseband correlators correlate the I channel and Q channel baseband signals with in-phase and quadrature-phase PN signals incorporating the local PN code sequence to produce despread on-time, advanced and delayed I channel and Q channel baseband signals. These despread baseband signals are processed and combined to produce an error signal proportional to a difference between the local PN code sequence and the received PN code sequence. A numerically-controlled oscillator circuit is responsive to the error signal to advance or delay the phase of a reference PN clock signal used to form a local PN clock signal. In operation, the rate of reading the local PN code sequence is accelerated or retarded to synchronize the local and the received PN code sequences.

19 Claims, 7 Drawing Figures

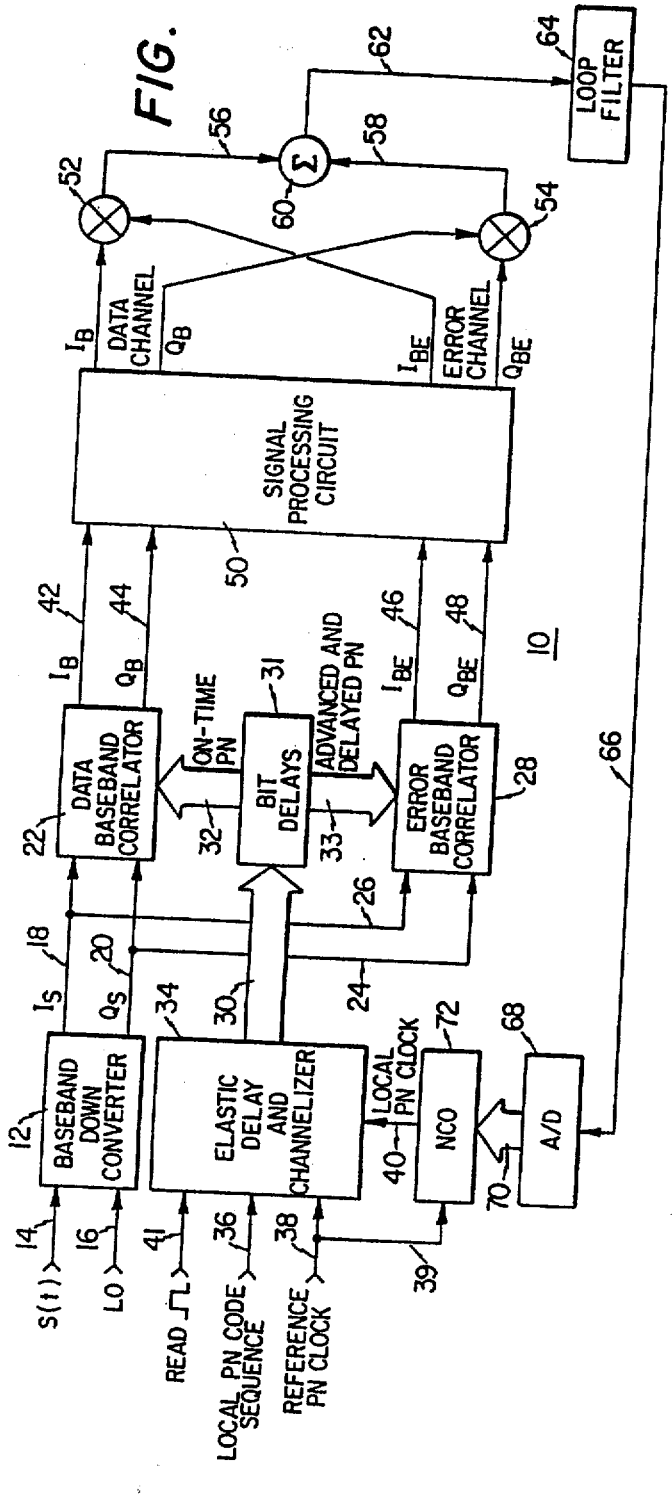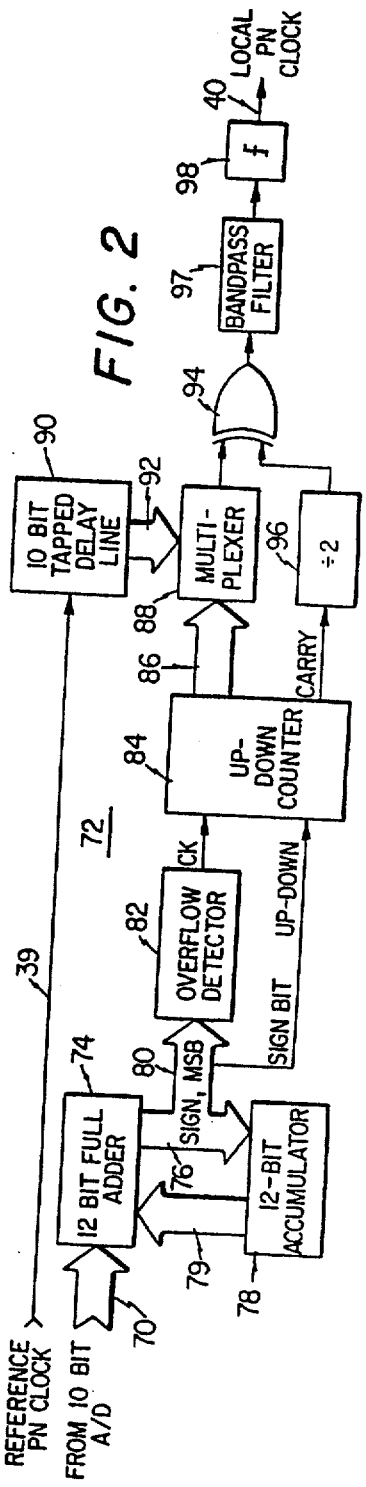

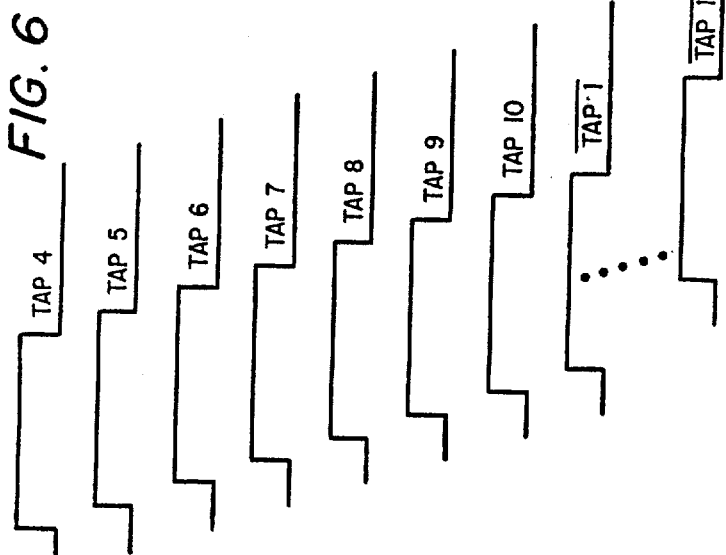
FIG. 6
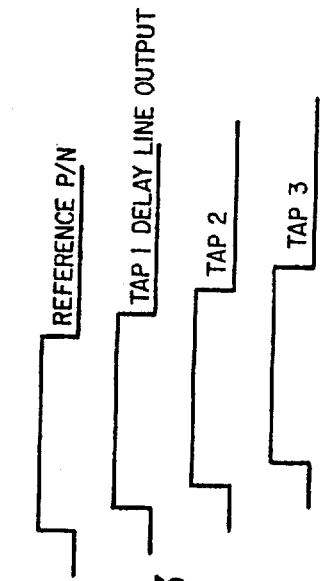
FIG. 3
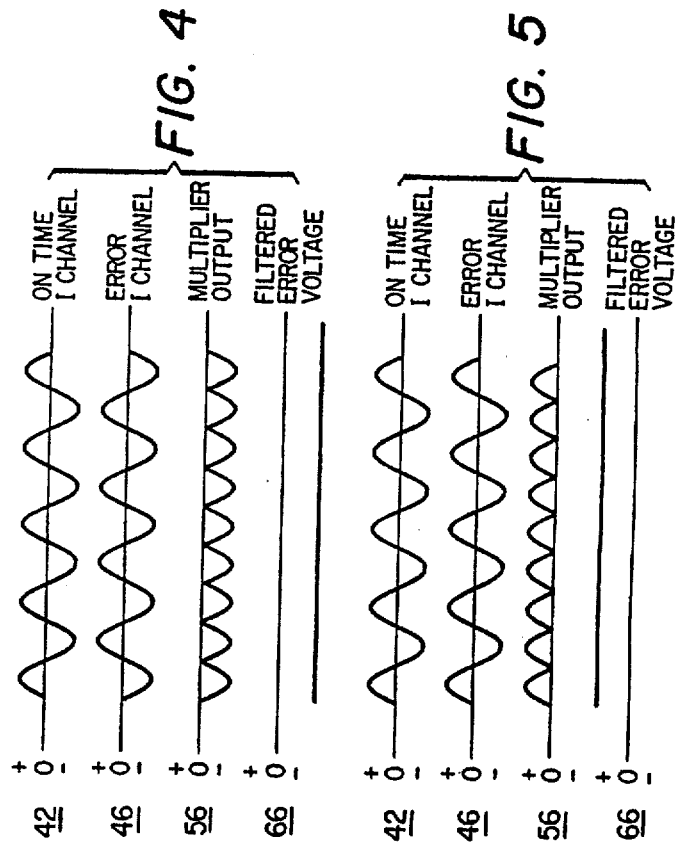
FIG. 4
FIG. 5

METHOD AND APPARATUS FOR BASEBAND TRACKING OF A PN CODE SEQUENCE IN A SPREAD SPECTRUM RECEIVER

TECHNICAL FIELD

The present invention relates generally to the detection of spread spectrum communication signals and more particularly to a baseband tracking loop for synchronizing the pseudonoise (PN) code sequence of a received spread spectrum signal to a local PN code sequence.

BACKGROUND OF THE INVENTION

In a spread spectrum communication system, the spread spectrum signal may be formed by phase modulating a narrowband signal by a pseudonoise (PN) code sequence. In such systems, effective recovery of the narrowband signal at the receiver requires synchronization between the received signal's PN code sequence and a local PN code sequence used to correlate the received signal. In prior art spread spectrum communication systems, synchronization tracking is usually performed by measuring the correlation at early and late times and forming a time discrimination function from such measurements to control the receiver's reference timing. However, since most spread spectrum systems correlate the received spread signal at RF, such "delay-lock" loop tracking schemes have utilized costly RF components. A baseband approach to the synchronization of the local and received PN code sequences is therefore desirable.

SUMMARY OF THE INVENTION

The present invention describes a baseband approach to the synchronization of the local and received PN code sequences in a spread spectrum communication system. In accordance with the invention, a baseband tracking loop comprises a phase comparator for translating the received spread spectrum signal to baseband to produce an I (in-phase) channel baseband signal and a Q (quadrature-phase) channel baseband signal. A data baseband correlator correlates the I channel and Q channel baseband signals with in-phase and quadrature-phase PN signals incorporating the local PN code sequence to produce despread on-time I channel and Q channel baseband signals. Similarly, an error baseband correlator is provided for correlating the I channel and Q channel baseband signals with advanced and delayed versions of the in-phase and quadrature-phase PN signals incorporating the local PN code sequence to produce despread advanced and delayed I channel and Q channel baseband signals.

The on-time, advanced and delayed I channel and Q channel baseband signals are processed and then combined to produce an error signal proportional to a difference between the local PN code sequence and the received PN code sequence. A numerically-controlled oscillator circuit is responsive to the error signal for forming a local PN clock signal from a reference PN clock signal, the local PN clock signal being used to control the reading of the local PN code sequence. In operation, the rate of reading the local PN code sequence is accelerated or retarded to synchronize the local and received PN code sequences.

BRIEF DESCRIPTION OF THE DRAWINGS

For a more complete understanding of the present invention and the advantages thereof, reference is now made to the following Description taken in conjunction with the accompanying Drawings in which:

FIG. 1 is a block diagram illustrating the baseband tracking loop of the present invention for synchronizing a local PN code sequence with a received PN code sequence incorporated in a received spread spectrum signal.

FIG. 2 is a block diagram of the numerically-controlled oscillator of FIG. 1 for advancing or delaying the phase of the reference PN clock signal.

FIG. 3 is an illustration of waveforms which are present in the circuit of FIG. 1 when the received PN code sequence is synchronized to the local PN code sequence.

FIGS. 4 and 5 illustrate the waveforms for the circuit of FIG. 1 when the received PN code sequence is delayed or advanced, respectively, with respect to the local PN code sequence.

FIG. 6 is an illustration of signal waveforms for the numerically-controlled oscillator circuit of FIG. 2.

DETAILED DESCRIPTION

Figure 7:
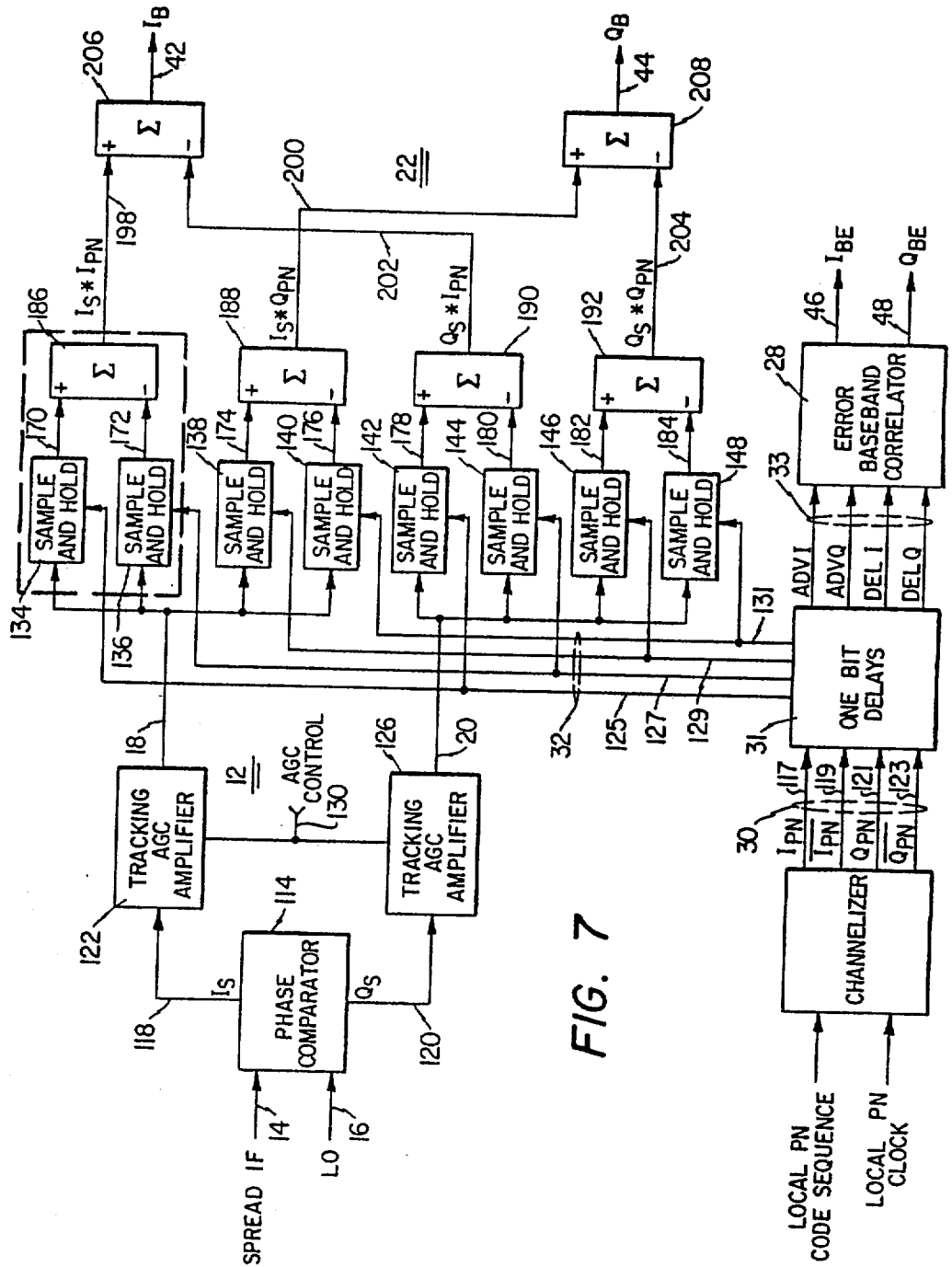
FIG. 7 is a block diagram showing the structure of the baseband down converter and one of the baseband correlators of FIG. 1.

Referring now to the drawings in which like reference characters designate like or corresponding parts throughout the several figures, FIG. 1 shows a block diagram of the baseband tracking loop of the present invention. As is well known in the prior art, a spread spectrum signal may be formed by phase modulating a narrowband signal by a pseudonoise (PN) code sequence. In such systems, effective recovery of the narrowband signal at the receiver requires synchronization between the received signal's PN code sequence and a local PN code sequence used to correlate the received signal. It is known in the prior art to perform synchronization tracking by measuring the correlation at early and late times and forming a time discrimination function from each measurements to control the receiver's reference timing. As will be described in more detail below, the baseband tracking loop of the present invention also serves to measure the correlation at early and late times to form an error function to control the receiver's reference timing. However, in contradistinction to such loop tracking schemes which utilize costly RF components, the tracking loop of the present invention operates at baseband.

Referring now to FIG. 1, the baseband tracking loop 10 includes a baseband down converter 12 connected to receive the IF spread specrum signal S(t) via line 14. As described above, this signal includes a PN code sequence which is used to phase modulate a narrowband signal at the spread spectrum transmitter. The baseband down converter 12 also receives a local oscillator signal LO via line 16. In operation, the baseband down converter 12 provides a phase comparison between the IF spread spectrum signal and the local oscillator signal to produce a difference I channel (in-phase) spread baseband signal designated $I_S$ on line 18, and a difference Q channel quadrature-phase) spead baseband signal designated $Q_S$ on a line 20.

The I channel and Q channel spread baseband signals are applied via lines 18 and 20 to a data baseband correlator 22. These signals are also applied via lines 24 and 26 to an error baseband correlator 28. The data baseband correlator 22 and the error baseband correlator 28 also receive input signals via buses 32 and 33, respectively. In particular, a local PN code sequence occurring early in time is applied to an elastic delay/channelizer circuit 34 via line 34. The local PN code sequence is the same as the PN code sequence incorporated into the transmitted spread spectrum signal. However, this local PN code sequence may be phase or frequency displaced from the received PN code sequence, thereby preventing effective correlation of the received spread spectrum signal. As will be described in more detail below, the baseband tracking loop 10 of the present invention serves to synchronize the local PN code sequence with the received PN code sequence. Referring back to FIG. 1, the elastic delay/channelizer circuit 34 also receives a reference PN clock signal via line 38 and a local PN clock signal via line 40. In response to a READ pulse received via line 41, the elastic delay/channelizer circuit 34 produces I channel and Q channel PN signals delayed within ±1 bit of the proper amount incorporating the local PN code sequences which are output on bus 30 and applied to the bit delay circuit 31. The bit delay circuit 31 delays the I channel and Q channel PN signals by different bit times to produce the on-time PN signals which are applied to the data baseband correlator 22 via bus 32, and the advanced and delayed PN signals which are applied to the error baseband correlator 28 via bus 33. More specifically bit delay circuit 31 delays the advanced PN signals by 1 bit, the on-time PN signals by 2 bits and the delayed PN signals by 3 bits.

The data baseband correlator 22 correlates the I channel and Q channel baseband signals $I_S$ and $Q_S$ with the on-time I channel and Q channel PN signals to produce despread on-time I channel and Q channel baseband signals, $I_B$ and $Q_B$, on lines 42 and 44. Likewise, the error baseband correlator 28 correlates the I channel and Q channel baseband signals $I_S$ and $Q_S$ with the advanced and delayed I channel and Q channel PN signals to produce despread advanced and delayed I channel and Q channel baseband signals, $I_{BE}$ and $Q_{BE}$, on lines 46 and 48. The on-time, advanced and delayed I channel and Q channel baseband signals on lines 42, 44, 46 and 48 are then supplied to a signal processing circuit 50 which provides appropriate filtering and gain control, as is well known in the prior art. In particular, where digital baseband data is being transmitted, the signal processing circuit 50 provides matched filtering through integrate and dump circuits. For analog baseband data, active or passive low pass filtering can be utilized. The signal processing circuit 50 also includes an automatic gain control circuit (for analog data) or a hard limiter circuit (for digital data) to insure that the signals applied to the remainder of the circuit are relatively insensitive to amplitude changes in the received spread spectrum signal. The processed on-time I channel and Q channel baseband signals form a data channel output from the signal processing circuit 50. Similarly, the processed advanced or delayed I channel and Q channel baseband signals from an error channel output from the signal processing circuit 50.

The data channel and error channel outputs from the signal processing circuit 50 are applied to the complex multiplier circuits 52 and 54. In particular, multiplier 52 receives the inphase outputs from the signal processing circuit while multiplier 54 receives the quadrature-phase outputs therefrom. The multipliers 52 and 54 produce outputs on lines 56 and 58 which are summed by summer 60 to produce an error signal E(t) on line 62. The error signal E(t) is proportional to a difference in a signal characteristic, e.g., the frequency or phase, of the local PN code sequence with respect to the received PN code sequence. Such a difference prevents proper correlation of the received spread spectrum signal. To ameliorate this problem, the error signal E(t) is supplied to a loop filter 64 which smoothes the signal to a D.C. level. The output of the loop filter 64 is supplied via line 66 to an analog-to-digital converter (A/D) 68 where a ten bit binary number is generated and supplied via bus 70 to a numerically-controlled oscillator 72. The numerically-controlled oscillator 72 receives the reference PN clock signal as an input via line 39 and produces the local PN clock signal as an output on line 40. As will be described in more detail below, the numerically-controller oscillator 72 advances or delays the phase of the reference PN clock signal to synchronize the local and received PN code sequences. In particular, the local PN clock signal controls the application of a READ pulse to the elastic delay/channelizer circuit 34 and thus controls the rate of reading the local PN code sequence.

Referring now to FIG. 2, the numerically-controlled oscillator 72 of FIG. 1 is shown in detail. In particular, the ten bit binary number representing the error signal E(t) is supplied via bus 70 to a twelve bit full adder 74 which is connected via bus 76 to a 12 bit accumulator 78. The output of the accumulator 78 is supplied back to the adder via bus 79. The most significant bit (MSB) and sign bit of the output value of adder 74 are supplied via bus 80 to an overflow detector 82. The sign bit is also supplied to the up-down counter 84. The overflow detector 82 senses the MSB each time the accumulator 78 overflows. The output of the overflow detecter clocks the updown counter 84 while the sign bit controls the direction of the count. The output of the up-down counter is supplied via a four bit bus 86 to a multiplexer 88. As seen in FIG. 2, the reference PN clock signal is supplied via line 39 to a ten bit tapped digital delay line 90 which is connected by a ten bit bus 92 to the multiplexer 88. As will be described in more detail below, the rate of overflow of the adder 74 is directly proportional to the magnitude of the error signal E(t) applied to the analog-to-digital converter 68 of FIG. 1. The output of the up-down counter 84 provides for advancing or retarding of the phase of the reference PN clock signal by selecting the proper delay tap of the delay line 90. The adjusted reference PN clock signal is applied to one input of an exclusive-OR gate 94, the other input thereto being the carry output of the up-down counter 84 which is divided by two by the divide circuit 96. The numerically-controller oscillator 72 provides for advancing or retarding the phase of the reference PN clock signal in increments of 1/20th (½ due to divide circuit 96×1/10 due to delay line 90) of the clock period. The output of the exclusive-OR gate 94 is filtered by bandpass filter 97 and limited by the threshold device 98 to form the local PN clock signal which is output on line 40. As noted above, the local PN clock signal is applied to the elastic delay/channelizer circuit 34 of FIG. 1 to control the application of the READ pulse thereto and thus the rate of reading the local PN code sequence used to correlate the received spread spectrum signal.

Referring now to FIGS. 3–6, the operation of the baseband tracking loop of the present invention will be described in detail. As noted above, effective recovery of the narrowband signal at the spread spectrum receiver requires synchronization between the received signal's PN code sequence and the local PN code sequence used to correlate the received signal. In the case where such synchronization exists, the output of the data baseband correlator 22 will be optimal and there will be no output from the error baseband correlator 28. This condition is shown in FIG. 3 for the I channel of the system. Each waveform in FIG. 3 is labeled by the line which carries the signal. As can be seen, when the received signal's PN code sequence and the local PN code sequence are synchronized, there is no error voltage present on line 66 from the output of the loop filter 64. Therefore, the numerically-controlled oscillator 72 does not advance or retard the reference PN clock signal used to generate the local PN clock signal.

FIG. 4 shows the condition where the received PN code sequence is delayed relative to the local PN code sequence. In this case, both the data baseband correlator 22 and the error baseband correlator 28 produce outputs. These output signals are 180° out of phase in the case where the received PN code sequence is late relative to the local PN code sequence. This 180° phase differential produces a negative error voltage on line 66. Referring simultaneously to FIGS. 1, 2 and 4, this negative error voltage is then applied to the A/D converter 68 where a ten bit binary number is generated and supplied to the numerically-controlled oscillator 72. In operation, this negative binary number is periodically added to the accumulator 78 to bring the total stored therein to become less positive, reducing the overflow rate detected by the overflow detector 82. As noted above, the rate of overflow is directly proportional to the magnitude of the negative error voltage on line 66. Moreover, the change in the sign bit from positive to negative due to the negative error voltage on line 66 will cause the up-down counter 84 to change directions so that progressively longer delays on the tapped digital delay line 90 are selected by the multiplexer 88. Referring briefly to FIG. 6, there is shown an illustration of the tapped delay line outputs. As can be seen, the phase of the reference PN clock signal may be advanced or delayed by the tapped delay line to one of ten values, TAP1–TAP10. The exclusive-OR gate 94 provides the waveforms TAP1–TAP10 by acting as a programmable inverter controlled by the carry output of the up-down counter 84. The tapped delay line and exclusive-OR gate thus provide increments of 1/20th of the PN clock signal.

Therefore, it can be seen that in response to the negative error voltage on line 66, the reference PN clock signal on line 39 is delayed by the numerically-controlled oscillator 72. The local PN clock signal on line 40 is now fed back to the elastic delay/channelizer circuit 34 to control the application of the READ pulse thereto. The elastic delay then serves to retard the rate of reading the local PN code sequence. This correction in phase of the local PN code sequence will act to optimize on-time correlation by allowing the received PN code sequence in the spread baseband signal to "catch-up" to the local PN code sequence. When these PN code sequences are synchronized, the output from the baseband error correlator 28 due to correlation with the delayed local PN code sequence will drop to zero. The output of multiplier 52 will also drop to zero as will the binary number applied to the numerically-controlled oscillator 72. As the error signal becomes zero, the adder 74 stops overflowing and therefore, the up-down counter 84 selects one particular reference PN clock pulse delay and thus introduces no further frequency shift. Therefore, in the absence of any further distrubance in the received PN code sequence's frequency or phase, on-time correlation remains optimized.

FIG. 5 shows the I channel signal waveforms for the case where the received PN code sequence is ahead of the local PN code sequence. In this case, the error baseband correlator 28 yields an output which is in phase with the data baseband correlator output on line 42. When these two signals are multiplied by complex multiplier 52, a positive error voltage results on line 66. This causes a positive binary number to be supplied to the adder 74 which changes the rate of overflow detected by the overflow detector 82. The positive error voltage on line 66 will eventually cause the sign bit to change the direction of the up-down counter 84 such that progressively shorter delays are selected from the tapped digital delay line 90 by the multiplexer 88. This effectively increases the frequency of the reference PN clock signal on line 39 by continuously advancing its phase.

The local PN clock signal on line 49 is now applied to the elastic delay/channelizer circuit 34 to control the application of the READ pulse thereto. The elastic delay then serves to accelerate the reading of the local PN code sequence to allow the sequence to "catch-up" with the received PN code sequence. Once optimal on-time correlation is again established, the error voltage on line 66 drops to zero. Therefore, the accumulator 78 stops overflowing and the up-down counter 84 selects one particular reference PN clock phase delay and thus introduces no further frequency shift. Therefore, in the absence of any further distrubance in the received PN code sequence's frequency or phase, on-time correlation remains optimized.

It should be noted that the waveforms shown in FIGS. 4 and 5 only illustrate the I channel of the spread spectrum system. It should be appreciated that the Q channel of the system also provides similar outputs on line 58 which are reflected in the error signal E(t) on line 66. It should also be recognized that the above examples of errors due to early and late arrival of the received spread baseband signal involve adjustment to realign the reference PN clock phase. However, if a continuous frequency error exists between the local and received PN code sequences, the baseband tracking loop 10 will also compensate for each error by continuously rotating the reference PN clock phase forward or back such that frequency and phase are matched.

Referring now to FIG. 7, the baseband down converter 12 and the data baseband correlator 22 of FIG. 1 will now be described in detail. These components of the baseband tracking loop 10 have been described in copending application Ser. No. 434,530 entitled, "Method and Apparatus for Despreading a Spread Spectrum Signal at Baseband," to Mosley, et al. With reference to FIG. 7, the baseband down converter 12 comprises a phase comparator 114 and tracking AGC amplifiers 122 and 126. The phase comparator receives the IF spread spectrum input signal S(t) incorporating the received PN code sequence via the line 14. The local oscillator signal LO is also input via the line 16 to the phase comparator 114. The spread IF input signal is phase compared (mixed) with the local oscillator signal to produce the I channel (in-phase) spread baseband signal designated $I_S$ at a line 118. The phase comparator 114 also produces a 90° phase offset local oscillator signal which is phase compared to the spread IF input signal to produce the Q channel (quadrature-phase) spread baseband signal designated $Q_S$ at a line 120.

Signal $I_S$ is passed through the tracking AGC amplifier 122 to the line 18. Signal $Q_S$ is passed through the tracking AGC amplifier 126 to the line 20. An ACG control signal is input through a line 130 to regulate the amplitude of the signals at lines 18 and 20. The AGC control signal is produced by an amplitude monitor (not shown) which monitors the amplitude of the baseband I channel and Q channel signals produced by the data baseband correlator 22. The amplifiers 122 and 126 are matched for tracking such that the phase and the amplitude of the signals $I_S$ and $Q_S$ are balanced.

The data baseband correlator 22 includes a group of eight sample and hold circuits which are labeled 134, 136, 138, 140, 142, 144, 146 and 148. The $I_S$ signal at line 18 is provided at the input to each of the sample and hold circuits 134, 136, 138 and 140. The $Q_S$ signal at line 20 is provided as the input to the sample and hold circuits 142, 144, 146 and 148. A channelizer circuit 116 which forms part of the elastic delay/channelizer circuit 34 of FIG. 1, is provided for converting the local-phase PN code sequence on line 36 into a four-phase signal. The channelizer 116, which is described in detail in the above-referenced patent application, produces four signals which are transmitted via lines 117, 119, 121 and 123 to the one bit delays 31. The lines 117, 119, 121 and 123 form the data bus 30 seen in FIG. 1. The channelizer produces an inphase PN signal $I_{PN}$ on line 117. The logical inverse of the inphase PN signal, $\bar{I}_{PN}$, is produced at line 119. A quadrature phase PN signal $Q_{PN}$ is produced at line 121. The logical inverse of the quadrature-phase PN signal, $\bar{Q}_{PN}$, is produced at line 123.

The signal $I_{PN}$ on line 117 is delayed in circuit 31 and provided to the control inputs of sample and hold circuits 134 and 142 via line 125. The signal $\bar{I}_{PN}$ on line 119 is delayed in circuit 31 and provided to the control inputs of sample and hold circuits 136 and 144 via line 127. Similarly, the signal $Q_{PN}$ on line 121 is delayed and provided to the control inputs of sample and hold circuits 138 and 146 via line 129. The signal $\bar{Q}_{PN}$ on line 123 is delayed and provided to the control inputs of sample and hold circuits 140 and 148 via line 131. The lines 125, 127, 129 and 131 form the data bus 32 seen in FIG. 1. The outputs of sample and hold circuits 134-148 are transmitted respectively through lines 170, 172, 174, 176, 178, 180, 182 and 184. Lines 170 and 172 provide inputs to a summer 186. The output of sample and hold circuit 136 is the negative input of summer 186. The lines 174 and 176 provide inputs to a summer 188. The output of sample and hold circuit 140 is the negative input to the summer 188. Lines 178 and 180 provide inputs to a summer 190. The output of sample and hold circuit 144 is the negative input to the summer 190. Lines 182 and 184 provide inputs to a summer 192. The output of sample and hold circuit 148 provides the negative input to the summer 192.

The combination of the sample and hold circuits 134 and 136 together with the summer 186 comprises a first double balance multiplier which produces a first product signal shown as $I_S^* I_{PN}$ at line 198. Sample and hold circuits 138 and 140 together with the summer 188 comprise a second double balance multiplier which produces a second product signal designated as $I_S^* Q_{PN}$ at line 200. Sample and hold circuits 142 and 144 together with the summer 190 comprise a third double balance multiplier which produces a third product signal designated as $Q_S^* I_{PN}$ at line 202. The combination of sample and hold circuits 146 and 148 together with the summer 192 comprise a fourth double balance multiplier for producing a fourth product signal designated as $Q_S^* Q_{PN}$ at a line 204.

The lines 198 and 202 provide inputs to a summer 206 with the line 202 comprising a negative input thereof. Similarly, the lines 200 and 204 provide inputs to a summer 208 with the line 204 comprising the negative input thereof. Summer 206 receives the product signals from summers 186 and 190 and produces therefrom the baseband I channel output signal $I_B$ at the line 42. Summer 208 receives the product signals from summers 188 and 192 and produces therefrom the baseband Q channel output signal $Q_B$ at the line 44. The baseband I and Q channel output signals are despread, i.e., correlated to remove the received PN code sequence.

The bit delay circuit 31 also produces the advanced and delayed versions of the in-phase and quadrature-phase PN signals incorporating the local PN code sequence. As noted above, the use of such sequences provide a measurement of the correlation of the spread spectrum signal at early and late times to control the receiver's reference timing. These signals are applied via bus 33 to the error baseband correlator 28 which has an identical structure to the data baseband correlator 28. The error baseband correlator 28 produces the despread advanced and delayed I channel and Q channel baseband signals $I_{BE}$ and $Q_{BE}$ on lines 46 and 48, respectively.

The other elements of the baseband tracking loop 10 of FIG. 1 are known in the prior art. For example, the elastic delay circuit may comprise a random access memory into which the local PN code sequence is written. In operation of the baseband tracking loop of the present invention, the local PN clock signal controls the application of the READ pulse to the elastic delay circuit and thus the rate of reading the local PN code sequence. Therefore, the elastic delay circuit accelerates or retards the reading of the local PN code sequence to synchronize this seqquence to the received PN code sequence.

The present invention provides a method and apparatus for baseband tracking of a local PN code sequence incorporated in a received PN code sequence incorporated in a received spread spectrum signal. In prior art spread spectrum communication systems, synchronization tracking is usually performed by measuring the correlation at early and late times and forming a time discrimination function from such measurements to control the receiver's reference timing. Such "delay-lock" loop tracking schemes have unfortunately required costly RF components. The present invention provides a baseband approach to the synchronization of the local and received PN code sequences. According to the invention, the received spread spectrum signal is first down converted to baseband. As data baseband correlator correlates the I channel and Q channel baseband signal with in-phase and gradrature-phase PN signals incorporating the local PN code sequence to produce despread on-time I channel and Q channel baseband signals. An error baseband correlator correlates the I channel and Q channel baseband signals with advanced and delayed versions of the in-phase and quadrature-phase PN signals incorporating the local PN code sequence to produce despread advanced and delayed I channel and Q channel baseband signals. After signal processing, the outputs of the data and error baseband correlators are combined to produce an error signal proportional to a difference between the local PN code sequence and the received PN code sequence. In operation, a numerically-controlled oscillator responsive to the error signal forms a local PN clock signal from a reference PN clock signal, the local PN clock signal being used to control the reading of the local PN code sequence.

The baseband tracking loop of the present invention obviates costly RF components. Further, the circuit eliminates the need for matched IF filters in the on-time and error path as well as the need for tracking variable gain stages at IF. Moreover, the use of the exclusive-OR gate in the numerically-controlled oscillator allows twenty increments of PN phase resolution to be obtained with a ten bit tapped delay line. Finally, this baseband technique is also more compatible with large scale integration processes.

Although the invention has been described and illustrated in detail, it is clearly understood the same is by way of illustration and example only and is not to be taken by way of limitation. The spirit and scope of the present invention are to be limited only by the terms of the appended claims.

We claim:

1. A baseband tracking loop for synchronizing a local PN code sequence with a received PN code sequence incorporated in a received spread spectrum signal, comprising:

means for reading said local PN code sequence;
   means for translating said received spread spectrum signal to baseband to produce an I (in-phase) channel baseband signal and a Q (quadrature-phase) channel baseband signal;
   first means for correlating said I channel and Q channel baseband signals with in-phase and quadrature-phase PN signals incorporating said local PN code sequence to produce despread on-time I channel and Q channel baseband signals;
   means for advancing or delaying said in-phase and quadrature-phase PN signals incorporated in said local PN code sequence;
   second means for correlating said I channel and Q channel baseband signals with the advanced and delayed versions of said in-phase and quadrature-phase PN signals incorporating said local PN code sequence to produce despread advanced and delayed I channel and Q channel baseband signals;
   means for combining the outputs of said first and second means for correlating to produce an error signal proportional to a difference between said local PN code sequence and said received PN code sequence; and
   means responsive to said error signal for forming a local PN clock signal from a reference PN clock signal, said local PN clock signal being used to control the reading of said local PN code sequence, wherein the rate of reading said local PN code sequence is accelerated or retarded to synchronize said local and received PN code sequences.

2. The baseband tracking loop as described in claim 1 wherein said first means for correlating comprises:
   means for multiplying each of said I and Q channel baseband signals by each of said in-phase and quadrature-phase PN code signals incorporating said local PN code sequence to produce first, second, third and fourth product signals,
   means for summing said first and second product signals to produce said on-time I channel baseband signal, and
   means for summing said third and fourth product signals to produce said on-time Q channel baseband signal.

3. The baseband tracking loop as described in claim 1 wherein said second means for correlating comprises:
   means for multiplying each of said I and Q channel baseband signals by each of said advanced and delayed versions of said in-phase and quadrature-phase PN signals incorporating said local PN code sequence to produce first, second, third and fourth product signals,
   means for summing said first and second product signals to produce said advanced and delayed I channel baseband signals, and
   means for summing said third and fourth product signals to produce said advanced and delayed Q channel baseband signals.

4. The baseband tracking loop as described in claim 1 wherein said means for combining includes signal processing means for insuring that said on-time, advanced and delayed I channel and Q channel baseband signals are insensitive to amplitude variations in said received spread spectrum signal.

5. The baseband tracking loop as described in claim 4 wherein the means for combining also includes:
   means for multiplying said on-time I channel baseband signal by said advanced and delayed I channel baseband signals to produce a first product signal, and
   means for multiplying said on-time Q channel baseband signal by said advanced and delayed Q channel baseband signals to produce a second product signal, and
   means for summing said first and second product signals to produce said error signal.

6. The baseband tracking loop as described in claim 1 wherein said means responsive to said error signal includes:
   means for delaying said reference PN clock signal, and means for selecting the amount of the delay provided by said means for delaying to advance or delay the phase of said reference PN clock signal.

7. The baseband tracking loop as described in claim 6 wherein said means for selecting includes:
   adder means for continuously summing binary representations of said error signal,
   accumulator means connected to said adder means for storing said summed value,
   detector means for detecting an overflow of said accumulator means, said overflow having a rate directly proportional to said error signal,
   counter means clocked by the output of said detector means, the direction of said count determined by the sign bit of said summed value, and
   multiplexer means connected to said counter means for selecting the amount of said delay in response to the output of said counter means.

8. The baseband tracking loop as described in claim 7 wherein said means for selecting also includes gate means connected to said multiplexer means and said counter means to provide additional increments of said delay provided by said means for delaying.

9. The baseband tracking loop as described in claim 1 wherein said means for reading includes a memory into which said local PN code sequence is written, said local PN clock signal controlling the reading of said local PN code sequence therefrom.

10. A baseband tracking loop for synchronizing a local PN code sequence with a received PN code sequence incorporated in a received spread spectrum signal, comprising:
   a phase comparator connected to receive said spread spectrum signal and a local oscillator signal for producing an I (in-phase) channel spread baseband signal and a Q (quadrature-phase) channel spread baseband signal;
   a data baseband correlator for receiving said I channel and said Q channel spread baseband signals and on-time in-phase and quadrature-phase PN signals incorporating said local PN code sequence to produce despread on-time I channel and Q channel baseband signals;
   means for advancing or delaying said in-phase and quadrature-phase PN signals incorporated in said local PN code sequence;
   an error baseband correlator for receiving said I channel and said Q channel spread baseband signals and the advanced and delayed versions of said in-phase and quadrature-phase PN signals incorporating said local PN code sequence to produce despread advanced and delayed I channel and Q channel baseband signals;
   signal processing means for combining the outputs of said data and baseband error correlators to produce an error signal proportional to a difference in a signal characteristic of said local PN code sequence with respect to said received PN code sequence;
   a numerically-controlled oscillator means responsive to said error signal for forming a local PN clock signal from a reference PN clock signal, said local PN clock signal being used to control the reading of said local PN code sequence; and
   elastic delay means for reading said local PN code sequence, wherein the rate of reading said local PN code sequence is accelerated or retarded to synchronize said local and received PN code sequence.

11. The baseband tracking loop as described in claim 10 where said elastic delay means is a random access memory into which said local PN code sequence is written, said local PN clock signal controlling the reading of said local PN code sequence therefrom.

12. The baseband tracking loop as described in claim 10 wherein said numerically-controlled oscillator means includes:
   means for delaying said reference PN clock signal, and
   means for selecting the amount of the delay provided by said means for delaying to cause an advance of delay of the phase of said reference PN clock signal.

13. A method for baseband tracking in a spread spectrum receiver for synchronizing a local PN code sequence with a received PN code sequence incorporated in a received spread spectrum signal, comprising the steps of:
   translating said received spread spectrum signal to baseband to produce an I (in-phase) channel baseband signal;
   correlating said I channel and Q channel baseband signals with in-phase and quadrature-phase PN signals incorporating said local PN code sequence to produce despread on-time I channel and Q channel baseband signals,
   correlating said I channel and Q channel baseband signals with advanced and delayed versions of said in-phase and quadrature-phase PN signals incorporating said local PN code sequence to produce despread advanced and delayed I channel and Q channel baseband signals,
   combining said on-time and said advanced and delayed I channel and Q channel baseband signals to produce an error signal proportional to a difference between said local PN code sequence and said received PN code sequence,
   varying the phase of a reference PN clock signal in response to said difference to form a local PN clock signal, and
   utilizing said local PN clock signal to control the reading of said local PN code sequence, wherein the rate of reading said local PN code sequence is accelerated or retarded to synchronize said local and received PN code sequences.

14. The method for synchronizing as described in claim 11 wherein said difference is a phase offset between said local PN code sequence and said received PN code sequence.

15. The method for synchronizing as described in claim 11 wherein said difference is a frequency offset between said local PN code sequence and said received PN code sequence.

16. A baseband tracking loop for synchronizing a local PN code sequence having advanced or delayed versions of in-phase and quadrature-phase PN signals with a received PN code sequence incorporated in a received spread spectrum signal that has been translated into an in-phase baseband signal and a quadrature-phase baseband signal, comprising:
   first means for correlating the in-phase and quadrature-phase baseband signals with in-phase and quadrature-phase PN signals incorporated in the local PN code sequence to produce the despread on-time in-phase and quadrature-phase baseband signals;
   second means for correlating the in-phase and quadrature-phase baseband signals with the advanced and delayed versions of the in-phase and quadrature-phase PN signals incorporated in the local PN code sequence to produce the despread advanced and delayed in-phase and quadrature-phase baseband signals; and
   means responsive to the outputs of said first and second means for correlating to synchronize the reading of the local PN code sequence with the received PN code sequence.

17. A baseband tracking loop as described in claim 16 including means for generating the advanced or delayed versions of the in-phase and quadrature-phase PN signals incorporated in the local PN code sequence.

18. A baseband tracking loop as described in claim 16 wherein said means responsive to the outputs of said first and second means for correlating includes means for combining the outputs of said first and second means for correlating to produce an error signal proportional to a difference between the local PN code sequence and the received PN code sequence.

19. A baseband tracking loop as described in claim 18 further including means responsive to the error signal for forming a local PN clock signal for accelerating or retarding the reading of the local PN code sequence to synchronize the local and received PN code sequences.

* * * * *